(No Model.)
T. J. SLATER.
DRAFT APPARATUS FOR HORSES.
No. 260,058. Patented June 27, 1882.
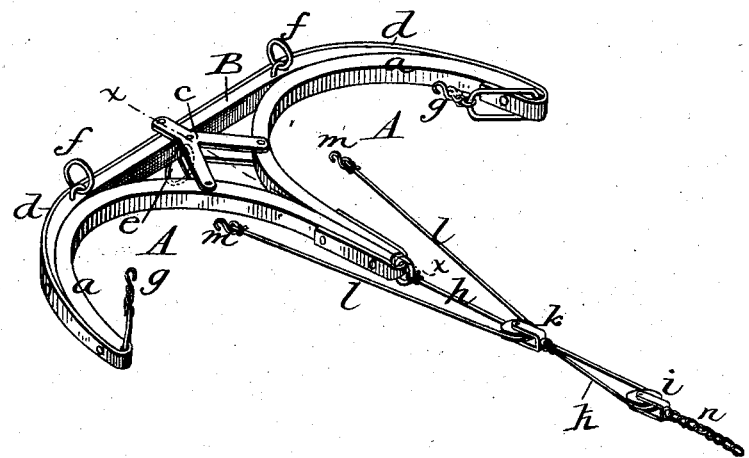
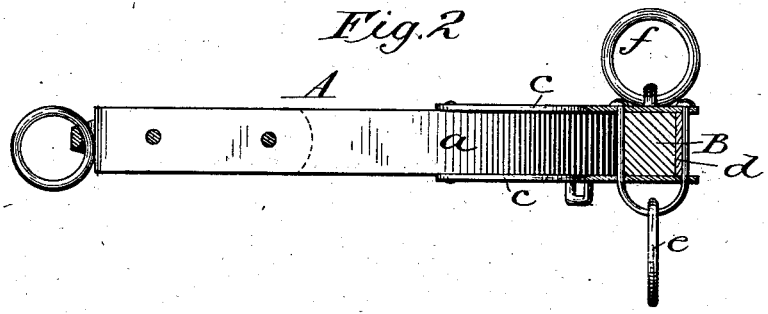

UNITED STATES PATENT OFFICE.

THEODORE J. SLATER, OF FREEHOLD, NEW YORK.

DRAFT APPARATUS FOR HORSES.

SPECIFICATION forming part of Letters Patent No. 260,058, dated June 27, 1882.

Application filed October 25, 1881. Renewed May 18, 1882. (No model.)

*To all whom it may concern:*

Be it known that I, THEODORE J. SLATER, of Freehold, in the county of Greene and State of New York, have invented certain Improvements in Draft Apparatus for Horses, of which the following is a specification.

The object of my invention is to provide means whereby the power exerted by a team of draft-animals may be more advantageously applied than by the means commonly in use, and to secure an equal distribution of the work between the two animals under all circumstances.

To this end the invention consists in a yoke of peculiar construction provided with means for attachment to the hames, and with equalizing-pulleys and other parts, hereinafter explained.

Figure 1 represents a perspective view of my apparatus complete; Fig. 2, a section of the same on the line $x\ x$.

In constructing my apparatus I first provide a double yoke, A, designed to be used in a horizontal position in front of the team, said yoke being constructed with two semicircular bows to admit the breasts of the animals. This yoke, the form of which is clearly shown in Fig. 1, may be constructed in any suitable manner, provided the form represented in the drawings is retained. I prefer, however, to construct the yoke, as shown, of two small U-shaped bows, $a$, secured to each other at their inner ends, and both secured within a larger outside bow, B, the three parts being firmly united by bolts, rivets, or other fastening devices.

In order to give the yoke additional strength, it has Y-shaped braces $c$, of metal, secured to its upper and lower sides, as indicated in the drawings, and also has a metal strap, $d$, secured around its outer edge, in the manner shown in the drawings, the ends of this strap being bent around from the interior face of the yoke, and serving as eyes for the attachment of other parts.

At its middle the yoke is provided on the under side with a ring, $e$, or its equivalent, to receive the tongue of the wagon or other vehicle. The yoke is also provided on the upper side, at the middle of the small bows, with two rings, $f$, designed to receive bail-straps, by which the yoke will be suspended in the same manner that an ordinary neck-yoke is suspended when in use.

The outer ends of the yoke are provided with hooks $g$, intended for attachment to the outer hames of the respective draft-animals.

To the center of the yoke, which will extend backward between the draft-animals, there is attached a rope or chain, $h$, which extends through a pulley-block, $i$, and carries at its free end a second pulley-block, $k$. Through the block $k$ there extends a chain or rope, $l$, the ends of which are provided with hooks $m$, designed for attachment to the inner hames of the draft-animals.

To the pulley $i$ there is attached a rope or chain, $n$, extending backward, and designed for attachment to the vehicle or other object to be drawn.

In making use of the device it is applied in a horizontal position, with its ends embracing the breasts or shoulders of the respective animals, the hooks $g$ and $m$ being engaged with the hames or equivalent parts of the harness, and the rings $f$ suspended by the bail-straps or equivalent means. Being thus connected, the yoke is held in position in front of the animals without coming in contact with them. When the team is driven forward the strain and power will be applied by the outer hames, through the hooks $g$, to the yoke, and from the inner hames, through the hooks $m$ and chains $l$, to the pulley $k$, and thence, through the chain $h$ and pulley $i$, to the center of the yoke. From the yoke the strain is transmitted, through chain $h$ and pulley $i$, to the draft-chain $n$.

It will be observed that under the above arrangement of parts the labor will be equally divided between the two animals, and the animals relieved from violent strains and shocks, to which they are subjected on rough roads when the ordinary appliances are employed.

While it is preferred to make use of the hooks $g$, it is obvious that straps, chains, or other equivalent means may be used for connecting the ends of the yoke with the hames of the harness. It is also obvious that the arrangement of equalizing chains and pulleys at the middle may be modified, provided a mode of action substantially such as described is secured.

Having thus described my invention, what I claim is—

1. In combination with the yokes A, having ends provided with means for connection to the hames, the chain $n$, pulley $i$, chain $h$, pulley $k$, and chain $l$, having its ends provided with fastening devices.

2. As an improvement in the construction of harness-yokes, the combination of the continuous outer bow and the two inner bows, secured to each other and to the outer bow, as described and shown.

3. A breast-yoke having two semicircular rigid ends, in combination with devices at the outer ends for attachment to the hames, and a central chain provided with attaching devices at its ends and connected by equalizing pulleys and chains with the middle of the yoke, substantially as described and shown.

THEODORE J. SLATER.

Witnesses:
  RODMAN DODGE,
  CURTIS R. LANE.